United States Patent [19]
Akeley et al.

[11] Patent Number: 5,051,737
[45] Date of Patent: Sep. 24, 1991

[54] EFFICIENT GRAPHICS PROCESS FOR CLIPPING POLYGONS

[75] Inventors: Kurt Akeley, Mountain View; Carl P. Korobkin, Palo Alto, both of Calif.

[73] Assignee: Silicon Graphics, Inc., Mountain View, Calif.

[21] Appl. No.: 314,554

[22] Filed: Feb. 23, 1989

[51] Int. Cl.$^5$ .............................................. G09G 1/14
[52] U.S. Cl. .................................... 340/747; 340/723; 340/721
[58] Field of Search ............... 340/747, 723, 728, 729, 340/703, 721, 724, 706

[56] References Cited

U.S. PATENT DOCUMENTS

| | | | |
|---|---|---|---|
| 3,889,107 | 6/1975 | Sutherland | 340/747 |
| 4,623,880 | 11/1986 | Bresenham et al. | 340/747 |
| 4,736,200 | 4/1988 | Ounuma | 340/723 |
| 4,821,209 | 4/1989 | Hempel et al. | 340/723 |

OTHER PUBLICATIONS

Newman, (Principles of Interactive Computer Graphics), Second Edition, New York, McGraw-Hill, 1981, pp. 67-70.

Foley and Van Dam, "Fundamentals of Interactive Computer Graphics", 1982, pp. 144-149.

*Primary Examiner*—Alvin E. Oberley
*Assistant Examiner*—Xiao Min Wu
*Attorney, Agent, or Firm*—Blakely, Sokoloff, Taylor & Zafman

[57] ABSTRACT

A system for displaying graphic images comprising an arrangement for clipping polygons against preselected clipping planes, an arrangement for determining when the vertices of a polygon all lie within one of a number of particular subspaces defined by the clipping planes, and an arrangement for disabling the means for clipping so long as all vertices of a polygon lie in the same subspace.

26 Claims, 2 Drawing Sheets

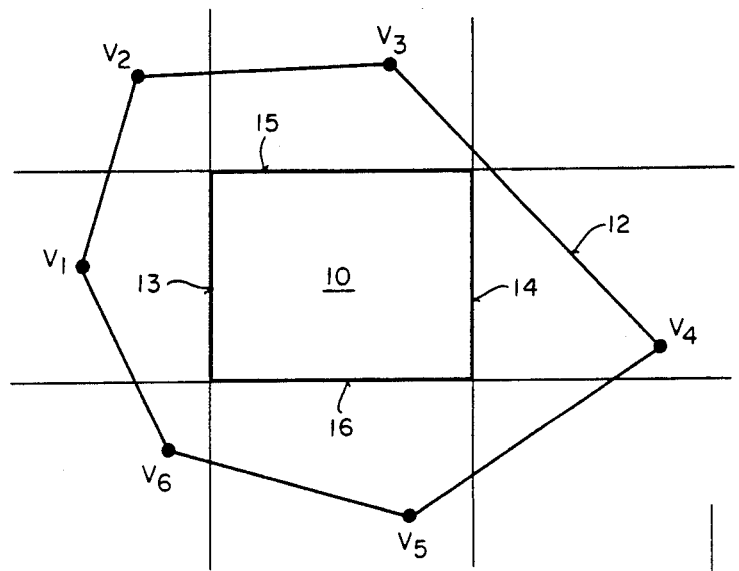
FIG_1
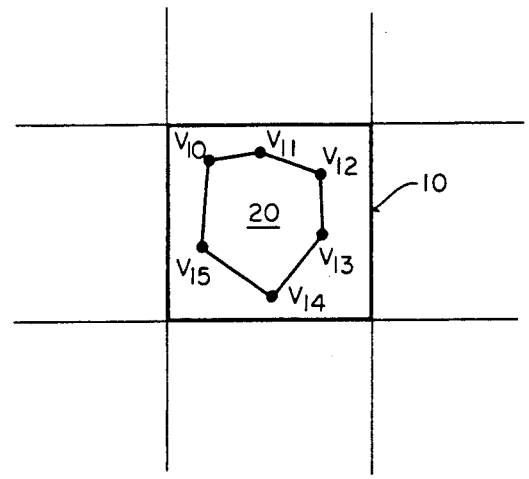
FIG_2
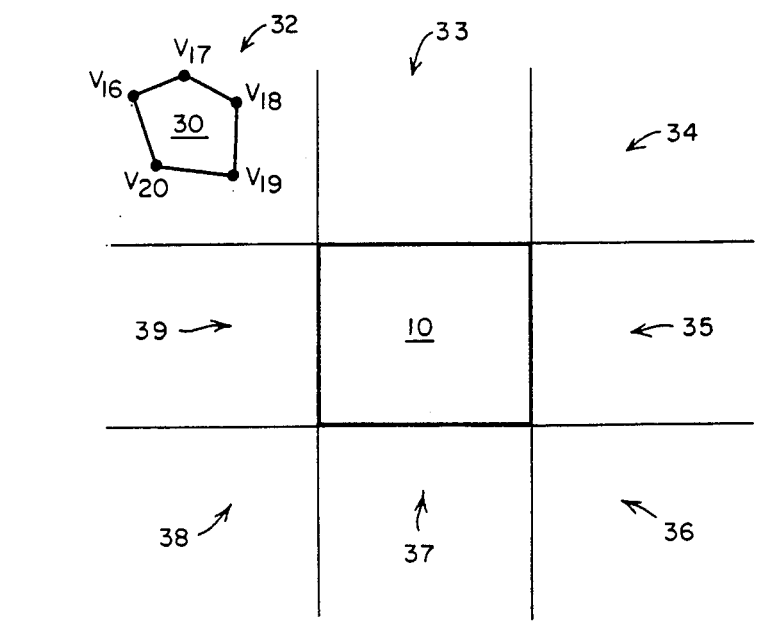
FIG_3

FIG_4
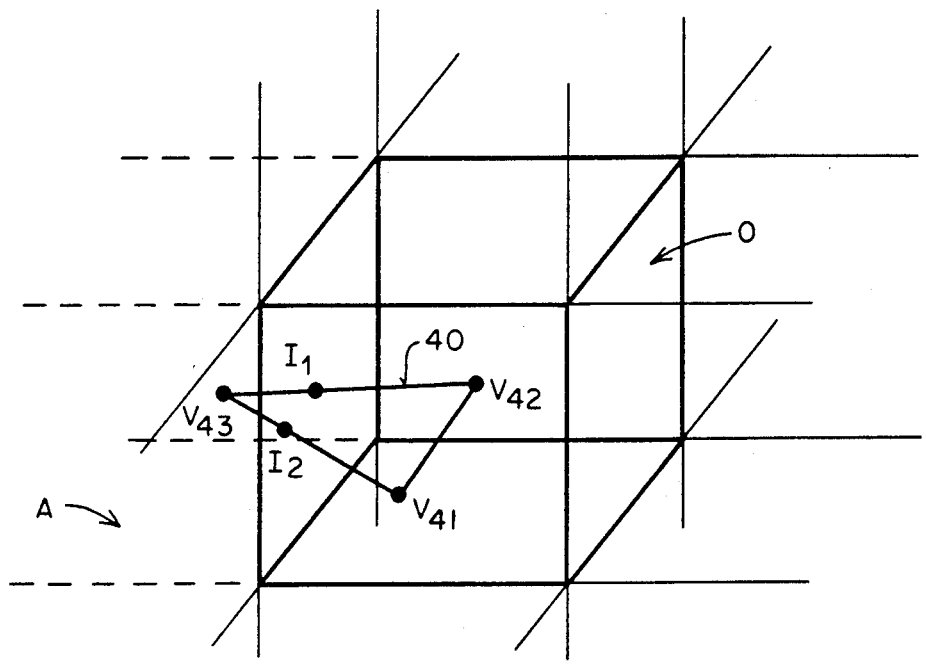
FIG_5
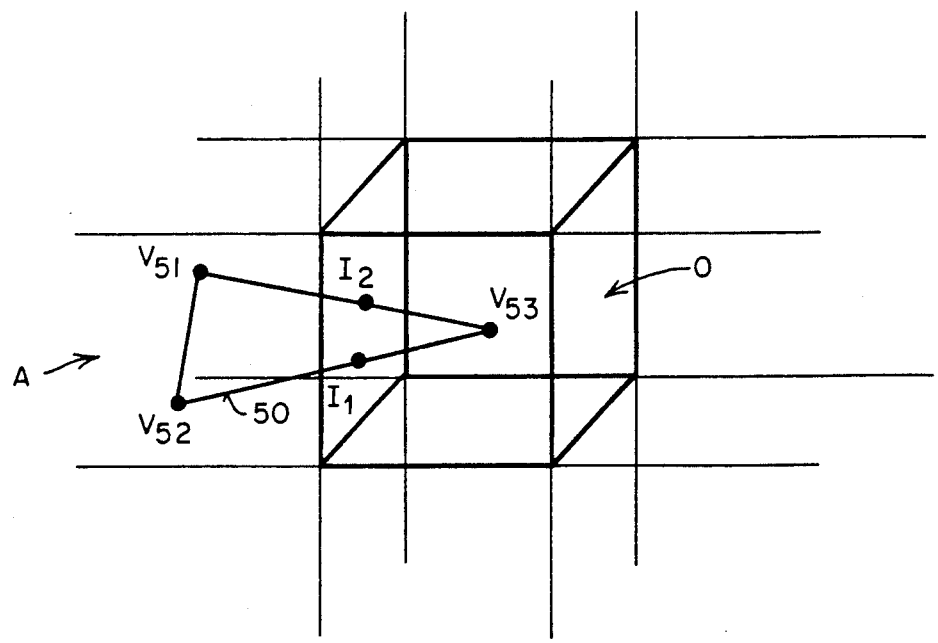

EFFICIENT GRAPHICS PROCESS FOR CLIPPING POLYGONS

BACKGROUND OF THE INVENTION

1. Field of the Invention

This invention relates to computer graphics systems and, more particularly, to an especially efficient process for clipping polygons.

2. History of the Prior Art

In computer graphic systems, it is necessary to represent both two and three dimensional pictures on a two dimensional screen. Often a portion of the actual picture to be represented falls outside the field of vision provided by the screen. This is especially true where the computer graphic system is one employing windows to define small areas of the screen within which individual programs or processes may be running.

In all such cases, it is necessary to select the desired portion of the picture which is to appear within the screen or the window of the screen. This process of selecting the desired portion and rejection the undesired portion has been termed "polygon clipping." It is essentially a process whereby a polygonal surface extending beyond the boundary of the selected area of the screen in which it is to appear is limited to the portion within the chosen area of the screen.

Although many clipping algorithms have been proposed and used, the Sutherland-Hodgman polygon clipping algorithm is the only simple and completely accurate algorithm for clipping polygons to a three dimensional volume.

This clipping algorithm is disclosed in U.S. Pat. No. 3,816,726, issued June 11, 1974. Basically, the algorithm treats both two and three dimensional images as a plurality of individual polygons. The polygons which may be clipped and then recomposed to represent the images in the scene. The clipping algorithm views the polygons as they would be seen within a truncated pyramid leading from the eye of the viewer. It clips each polygon to fit within the six planes which define that pyramid. These six planes are a top plane, a bottom plane, a left plane, a right plane, a near plane (which lies in the plane of the screen of the viewing device), and a far plane. The near and far planes are referred to in the above referenced patent as the hither and yon planes. Before beginning the clipping operation, a limited transformation is applied to the data provided for the image to be defined to place the clipping planes at any desired locations. The algorithm commences comparing the polygonal shape to the clipping surfaces using only the vertices defining the polygon.

For each polygon, the vertices are treated one at a time from a beginning vertex. In each comparison, the algorithm determines whether the newly-considered vertex lies within the visible area or outside of it. From this and the just-previously-considered vertex, it determines what values to output, what intersections to compute, and so on. It will be understood that there are only four possible ways in which a line joining two vertices of a polygon may relate to a particular clipping plane. The line may lie entirely within the visible area defined by that clipping plane, it may lie entirely out of the visible area defined by that plane, it may cross from the visible to the invisible area defined by the plane, or it may cross from the invisible to the visible area.

The algorithm takes the beginning vertex of the polygon and stores its value as a first vertex value so that the algorithm may determine when the polygon has closed upon itself. The algorithm then determines whether the beginning vertex is within the visible portion of the display. If the vertex is within the visible portion of the display, it is provided as an output to be displayed. As each vertex is considered, it is also saved and designated as vertex S the saved vertex. The algorithm then considers the second vertex. The first determination is whether the second vertex is on the same side of the clipping plane as the last vertex, saved as vertex S. If this new vertex is in the visible area and if the saved vertex S is in the visible area, the new vertex is also provided as an output and is stored as the new vertex S. If, on the other hand, the new vertex is outside the visible area with respect to the particular clipping plane, the algorithm computes the point of intersection I with the clipping plane of the line between the new vertex and the vertex S. This intersection is provided as output for display while the invisible second vertex is saved as the new vertex S.

The algorithm continues from an invisible vertex stored as a vertex S to the next vertex of the polygon. If this vertex is also invisible, no intersection need be computed. The new vertex is simply stored as the new vertex S, and no output is provided for the display. If, on the other hand, the new vertex is visible so that the vertices are on opposite sides of the clipping plane, a new intersection I is computed between the clipping plane of interest and the line joining the new vertex and the present vertex S; this intersection I is provided as an output for the display. The new vertex being visible is also provided as an output for display, and the new vertex becomes the vertex S.

This operation continues until the polygon closes on itself. Closure is detected when it is explicitly requested by the system, i.e. the last vertex is tagged, or a close operation is requested. Once completed with respect to one clipping plane, the operation for the polygon continues for each of the remaining clipping planes. In general, because of the number of individual operations required by the algorithm, this requires that a three dimensional image clipping determination must be handled by six individual clipping engines in order to be completed within a reasonable period.

The operation of the Sutherland-Hodgman clipping algorithm is simple and completely accurate. Moreover, it handles very complicated situations such as those in which all of the vertices of a polygon lie outside but surrounding the visible area. In such a situation, the polygon may influence what appears in the visible area without any of its sides being visible. For example, such a polygon controls the color of the visible area or what appears in the visible area without providing an edge within the visible area.

While the implementations of the Sutherland-Hodgman algorithm provide correct clipping, they require a substantial amount of computer hardware and incur substantial execution costs. For example, in a particular system utilizing the Sutherland-Hodgman algorithm, at least half of the hardware utilized for providing the graphics output system is used for clipping while the necessary use of such hardware is but a trivial part of the operation of the system. Even so, the system is required to process each polygonal form through the clipping algorithm hardware whether or not it would be affected by the clipping operation.

This result occurs in the exemplary system and in most operations because there are a number of situations in which the use of the clipping algorithm is trivial. For example, if all of the vertices of the polygon lie within the visible area, then the polygon may simply be displayed upon the computer output display, and the clipping algorithm need not be utilized. This is a substantial portion of the operation. Moreover, if all of the vertices lie outside of the visible area in an area such that no lines defining the polygon affect the visible area, then the clipping algorithm need not be applied. This also is a substantial portion of the system operation using the Sutherland-Hodgman algorithm.

It is, therefore, an object of the present invention to provide an efficient graphics process for clipping two and three dimensional images.

It is another object of the present invention to speed the clipping process in the presentation of computer graphics.

It is an additional object of the present invention to improve clipping algorithms by eliminating those trivial portions of such algorithms which find substantial use in computer graphics systems.

It is another object of the present invention to reduce the cost of computer graphics hardware.

SUMMARY OF THE INVENTION

These and other objects of the invention are realized in a computer graphics system which comprises apparatus for clipping polygons against preselected clipping planes, apparatus for determining when the vertices of a polygon all lie within one of a number of particular subspaces defined by the clipping planes, and apparatus for disabling the apparatus for clipping so long as all vertices of a polygon lie in the same subspace. The computer graphics system treats two special cases as trivial and, in such cases, directly renders or ignores the polygon without implementing the clipping apparatus.

These and other features of the invention will become apparent to those skilled in the art upon reading the following detailed description in conjunction with the drawings in which like designations have been used to describe like elements throughout the several views.

FIG. 1 is a diagram illustrating a particular polygon which is accurately handled by prior art clipping arrangements;

FIG. 2 is a diagram illustrating a second particular polygon which constitutes a trivial clipping instance;

FIG. 3 is a diagram illustrating a third particular polygon which constitutes another trivial clipping instance;

FIG. 4 is a diagram illustrating a first trivial clipping situation; and

FIG. 5 is a diagram illustrating a second trivial clipping situation.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to associated with the appropriate physical quantities and are merely convenient labels applied to these quantities.

Futher, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

Referring now to FIG. 1 there is shown a two-dimensional view of a computer output display 10. The display 10 may encompass the entire display of an output display device such as a cathode ray tube (CRT) or a window portion thereof. A polygon 12 designated by its vertices $V_1$, $V_2$, $V_3$, $V_4$, $V_5$, and $V_6$ is illustrated in FIG. 1. As will be noted, the polygon joining the vertices $V_1$ to $V_6$ and connecting back to $V_1$ is such that all of the vertices lie outside of the screen 10. Although such a polygon 12 shown in FIG. 1 has no side which intersects the screen 10, the polygon does influence what is shown on the screen 10. For example, in a color system, the polygon 12 may determine the color of the entire screen or it may determine elements which are hidden from view. Whether the polygon 12 affects the screen is a very complicated problem. It has been found that the Sutherland-Hodgman algorithm is the only completely correct method of determining whether the polygon 12 affects what appears on the screen 10.

Because the Sutherland-Hodgman algorithm is the only completely correct method of handling a situation such as that illustrated in FIG. 1, this algorithm has been implemented in most computer graphics systems used for clipping of polygons on an output display. As explained above, an implementation of the Sutherland-Hodgman algorithm requires that each polygon be clipped vertex by vertex against each clipping plane. In the polygon 12 shown in FIG. 1, the clipping planes are the left side of the screen 10 designated as clipping plane 13, the right side of the screen 10 designated as clipping plane 14, the upper boundary of the screen 10 designated as clipping plane 15, and the lower boundary of the screen 10 designated as clipping plane 16. The number of clipping planes may be extended to include the near clipping plane lying toward the front surface of the screen 10 and a far clipping plane lying at some determined distance behind the near clipping plane. It is also correct mathematically that additional planes might also be clipped by the algorithm.

When a polygon is clipped with respect to these clipping planes using the Sutherland-Hodgman algorithm, each vertex is handled serially for each clipping plane so that the algorithm steps through all six vertices of the polygon 12 one after the other, e.g., first with respect to the left clipping plane, then with respect to the right clipping plane, the top clipping plan, and the bottom clipping plane. In each comparison, the algorithm determines whether the vertex lies within the visible area or outside of it. From this, it determines what values to output, what intersections to compute, and so on. This is the process of the algorithm for a display of two-dimensional objects such as that shown in FIG. 1. As pointed out, this is the only computationally correct method in determining whether the particular polygon affects what appears on the screen 10 in the situation illustrated in FIG. 1.

In order to best describe the invention, various aspects thereof have been reduced to pseudocode representations which are very similar to the C programming language. Such pseudocode is quite familiar to those skilled in the computer arts.

The Sutherland-Hodgman algorithm may be represented in pseudocode as:

```
Boolean First = TRUE
Vertex F,S,P
vertex (P)
{
    If      (First)
            F = P
            First = FALSE
    Else if (P and S on opposite sides of clip plane)
            compute intersection I of line SP and the clip plane
            output (I)
    S = P
    If (S on visible side of clip plane)
            output (S)
}
close()
{
    if (F and S on opposite sides of clip plane)
            compute intersection I of line FS and the clip plane
            output (I)
    First = TRUE
    output (close command)
}
```

As may be seen from the pseudocode representation, the boolean variable First is initially set to true, then vertices P are considered by the algorithm. For the first vertex, the value of P is stored as F which represents the first vertex of the polygon; then the First flag is set to false to indicate that the following vertices are not the first vertex of the polygon. Then the value of P is stored as S to represent the saved vertex. The position of S is tested and, if it is on the visible side of the clip plane, is provided as an output for the display.

For each subsequent vertex P, the intersection at the line PS and the plane is output (if P and S are on opposite sides), then P is output (if it is on the visible side), then S is set to P. Finally, after the last vertex P has been processed, the algorithm checks whether the first and saved vertices are on opposite sides of the clip plane. If so, the algorithm computes an intersection I of the line connecting the first and saved vertices and the clip plane, provides this intersection value as an output, resets the first flag to true, and indicates that the closure has occurred.

This process takes place with respect to each clipping plane.

FIG. 2 demonstrates a second polygon 20 in which all of the vertices $V_{10}$, $V_{11}$, $V_{12}$, $V_{13}$, $V_{14}$, and $V_{15}$ lie within the visible area of the screen 10. With such a polygon, a system implementing the Sutherland-Hodgman algorithm again steps through each vertex $V_{10}$–$V_{15}$ with respect to each of the clipping planes even though each of the vertices $V_{10}$–$V_{15}$ lies within the visible area and no clipping need be done to display the polygon 20 correctly. This process requires a substantial period of time with respect to each clipping plane and involves clipping engine hardware for each of four individual clipping planes in the two-dimensional case shown in FIG. 2. In a case in which three dimensions are to be displayed in a two-dimensional area, six individual clipping engines are required, and the Sutherland-Hodgman algorithm must step through each vertex with respect to each of these clipping plane using each clipping engine. The reason that the process has been required even though the vertices all lie within the visible space is that most systems do not have facilities for storing all of the vertices and other information relating to all of the clipping planes. Consequently, if a number of vertices are in the visible region and a later vertex falls outside the region, the system must have stored and have available the information to reconstruct the polygon for clipping. It has, therefore, appeared simpler to go through each step of the Sutherland-Hodgman clipping algorithm rather than attempt to provide facilities to reconstruct the situation when clipping later became necessary.

FIG. 3 illustrates another polygon 30 in which all of the vertices $V_{16}$–$V_{20}$ lie outside the visible screen area of the screen 10. In FIG. 3, the vertices $V_{16}$–$V_{20}$ all lie in an area 32 which for the purposes of this specification may be defined as a single external area outside the two-dimensional screen 10. As shown in FIG. 3, the areas external to the screen 10 with respect a two dimensional image are eight in total; these are designated in FIG. 3 as areas 32–39. It will be understood by those skilled in the art that the polygon 30 defined by the vertices $V_{16}$–$V_{20}$ can have no possible affect on what appears on the screen 10 even though all of the vertices are to be clipped. This is true for the simple reasons that since all of the vertices $V_{16}$–$V_{20}$ lie in the same external area 32, none of the lines connecting those vertices and defining the polygon 30 can possibly intersect a clipping plane of the screen 10. It should also be obvious to those skilled in the art that the same is true of any image the vertices of which lie in any other single external area 33–39 around the screen 10. Thus, FIG. 3 illustrates a trivial situation in which clipping need not be practiced in order to determine whether the polygon affects the screen 10. All of the vertices may be simply ignored as having no affect on the screen 10.

However, in a system utilizing the Sutherland-Hodgman algorithm, the hardware compares each vertex of the polygon 30 with each clipping plane to determine whether the vertex lies within or outside of the visible space, using each of the clipping engines (four in the case of a two-dimensional object) in serial order. Again, this use of the computer graphics hardware is extremely time consuming and costly in both hardware and in the operating time required for the process involved.

The present invention eliminates the trivial cases illustrated in FIGS. 2 and 3 from the operation of the clipping algorithm and thereby both significantly speeds the operation of the computer graphics display system and significantly reduces the hardware costs of such a system. The present invention accomplishes the foregoing by determining when all vertices of a polygon being described lie in the same particular area (or space) whether that area is in fact the visible area or one of the individual external areas surrounding the screen in two or three-dimensional form. Having determined that all vertices lie in such a region, the invention dismisses the case as trivial so that the implementation of the Sutherland-Hodgman algorithm is unnecessary. The dismissal of these trivial cases by the invention allows the number of clipping engines to be reduced from the normally required six to a single clipping engine. This single clipping engine may be utilized to compare a polygon of interest to each of the clipping planes in serial fashion in those cases in which clipping is not a trivial case.

Thus, the need for a number of clipping engines equal to the number of clipping planes may be eliminated by making the clipping operation recursive and using the same clipping engine for each of the clipping operations. The pseudocode representation of this implementation follows:

```
Boolean First [MAXPLANE] = TRUE
Vertex F [MAXPLANE],S[MAXPLANE]
clip(p,P)
{
    if (First[p])
        F[p] = P
        First[p] = FALSE
    else if (P and S[p] are on opposite sides of Plane[p])
        compute the intersection I of line S[p]P and Plane[p]
        if (p = = MAXPLANE)
            output (I)
        else
            clip(p+1,I)
    S[p] = P
    if (S[p] is on the visible side of Plane[p])
        if (p = = MAXPLANE)
            output (S[p])
        else
            clip (p+1,S[p])
}
close (p)
{
    if (F[p] and S[p] are on opposite sides of Plane[p])
        compute the intersection I of line F[p]S[p] and Plane[p]
        if (p = = MAXPLANE)
            output (I)
        else
            clip(p+1,I)
    First[p] = TRUE
    if (p = = MAXPLANE)
        output (close command)
    else
        close (p+1)
}
```

As may be seen, the algorithm initializes the First flag as true for each of the clipping planes involved and provides storage for F (the first vertex) and S (the saved vertex) for each of the clipping planes. It then enters the clip process for the first clipping plane for the first vertex, stores the first vertex as F for the first clipping plane, and sets the First flag for that plane to false so that later considered vertices are considered to be such. The algorithm then sets the saved vertex S for that clipping plane to the value of P (the new vertex), checks to see whether S is on the visible side of the clipping plane, checks to see whether this is the last clipping plane, and then reenters the clip algorithm using the next clipping plane and the value stored as S. The algorithm, as written, is recursive so that the first vertex is checked against each clipping plane, setting the First vertex value and resetting the First flag for that clipping plane to false until the first vertex has been checked against all clipping planes. When the final clipping plane (MAXPLANE) is reached and the vertex S is still on the visible side of that clipping plane, the S vertex value is provided as an output for the display. If at some evaluation against one of the clipping planes, the S value is not visible, the algorithm stores the value of the vertex as S for that plane before continuing.

After the first vertex of a polygon has been treated, the next vertex is furnished to the circuitry implementing the algorithm. This not being the first vertex, this next vertex is checked against the S value representing the previous vertex to determine whether the vertices are on the same side of the first clipping plane. If on opposite sides, an intersection I is computed and the clip algorithm is reentered for the next clipping plane using the intersection value I instead of P. When the final clipping plane is reached, the value of the intersection point I is output if still on the visible side of the final clipping plane.

On the other hand, if S and the new vertex P are on the same side of a clipping plane as the second vertex is checked, S is set to the new vertex value P and, if on the visible side of the clipping plane and the last clipping plane has been reached, the value of the new vertex is provided as output for display. If not the last plane, the clip algorithm is reentered and evaluates the new vertex P and the line SP against the new clipping plane in the manner above described.

If at some clipping plane, the value of the new vertex P being checked and the saved value S are on different sides of the clipping plane, an intersection I with the clipping plane is computed, and used in place of P in the tests against the other clipping planes. If this value remains visible throughout the tests against all of the planes, it is finally provided as output for the display, and the next vertex is in turn tested against all of the clipping planes.

Ultimately, the close process is entered as the last vertex of the polygon is reached. This process is also recursive so that each of the clipping planes is treated with respect to the last vertex, and an output is provided for an intersection I if the first and last vertices are on opposite sides of the last clipping plane. The close process also reinitializes each of the flags First for each clipping plane and closes the particular operation.

The implementation of this recursive algorithm allows the invention to operate correctly using a single processor. Even so, the operation remains inefficient for the two classes of polygons discussed above in which all of the vertices lie either in the visible space of the display or in a single external space. For that reason, a sequential test has been devised for detecting a class of polygons which do not intersect the surface of the viewing space and can, therefore, be either accepted or rejected without utilizing the Sutherland-Hodgman algorithm. A more difficult question to answer is how to recover from such a test once it has begun and fails. This question arises because, as mentioned above, the systems using the Sutherland-Hodgman algorithm usually do not have the resources to store all of the vertices and other values necessary to describe the clipped polygon. Yet the system must be able to recreate the polygon if, for example, one of the two trivial cases discussed above becomes non-trivial after a number of vertices have been processed.

The first test for detecting the class of polygons which fit the two trivial cases is met by dividing the space about the visible space into twenty-six distinct spaces (twenty-seven if the visible space is included), the spaces defined by the six usual clipping planes. It should be noted that the eight areas surrounding a two dimensional representation would be used for such a two-dimensional representation, but the volumetric representation includes the two dimensional and provides a more complete explication of the invention. All of these spaces including the visible space may be numbered, and the space in which each vertex lies assigned to that vertex. Then the test is whether all the vertices of the polygon are in the same subspace. If they are, and the subspace is the visible subspace, the polygon is trivially accepted and drawn without change. If all of the vertices are in the same subspace but that subspace is other than the visible subspace, then the polygon is trivially rejected and not drawn on the display. In either case, the Sutherland-Hodgman algorithm need not be utilized; and substantial processing time is saved.

However, if a number of vertices have already been processed for a polygon and all have fallen in the same subspace so that to that point the system considers the polygon as falling into one of the trivial cases and then a vertex is processed which is not in the same subspace, the system must be able to correctly clip the polygon. In order to accomplish this, the history of the two different trivial situations must be reviewed. This review shows that if all previous vertices were in the visible subspace, then each stage of the Sutherland-Hodgman algorithm would have set F to the original vertex and S to the just previous vertex had the Sutherland-Hodgman algorithm been implemented; moreover, each of the previous vertices would have been provided as output for the display. Assuming the Sutherland-Hodgman algorithm had not been utilized, the trivial accept algorithm would also at this point have provided all of the previous vertices as output for the display. Consequently, all that is necessary to implement a complete trivial accept algorithm is that it have saved the first and the just previous vertices so that the Sutherland-Hodgman algorithm may be correctly entered. This result may be accomplished by implementing the following initializing algorithm when what has appeared to be a trivial accept polygon presents a vertex which lies outside the visible subspace.

For (p is 1 through MAXPLANE)
    First [p] = FALSE
    F[p] = original vertex
    S[p] = previous vertex
clip(1, current vertex)

As may be seen, for each clipping plane, the First flag is set to false, the original vertex is stored as the First vertex value F, the previous vertex is stored as S, and the clip algorithm discussed above is entered. Since the previously reviewed vertices have already been provided as outputs and the clip algorithm provides the appropriate clipping for the remainder the polygon, the entire polygon is correctly clipped and displayed.

For the case in which all previous vertices were in a single subspace outside the visible subspace, then each stage of the Sutherland-Hodgman algorithm would have set F to the original vertex and S to the just-previous vertex. However, none of the previous vertices would have been provided as output for the display since none were visible. Moreover, in reviewing the manner in which the S-H algorithm would have operated, it will be seen that for each vertex, the S-H algorithm stores the new vertex P as the last vertex and moves to the next clipping plane until the point at which the line between S and P crosses the particular clipping plane to the visible side. Consequently, stages prior to the crossing of the clipping plane would have F and S values and First flags set to false while later stages would have F and S undefined and First flags set true. Assuming the Sutherland-Hodgman algorithm has not been utilized, the trivial accept algorithm would also at this point have rejected all of the previous vertices as output for the display.

Consequently, it is necessary for the trivial reject algorithm to initialize the system by implementing the following algorithm when what has appeared to be a trivial reject polygon presents a vertex which lies in a different subspace.

```
For (p is 1 through MAXPLANE)
        First[p] = FALSE
        F[p] = original vertex
        S[p] = previous vertex
        If (current vertex is on non-visible side of Plane[p])
            exit from this loop.
clip(1,current vertex)
```

As may be seen, this algorithm causes sufficient information to be provided for each of the vertices with respect to each of the clipping planes so that the Sutherland-Hodgman algorithm may be implemented from that point at which the vertex appears in a different subspace.

The complete operation of the invention is implemented by circuitry which functions in accordance with the pseudocode operations described below.

```
/* variables used by the trivial accept/reject part of the code */
Boolean Tfirst = TRUE
Boolean PrevOut = FALSE
Boolean ReallyClip = FALSE
Integer SaveSpace
Vertex TF, TS
/* variables used by the Sutherland-Hodgman part of the code */
Boolean First [MAXPLANE] = TRUE
Vertex F[MAXPLANE],S[MAXPLANE]
trivclip(P)
{
    compute subspace of P
    if (Tfirst)
        Tfirst = FALSE
```

```
            TF = TS = P
        if (substance = = 0)
                /* trivial accept of first vertex */
                output (P)
        else
                /* trivial reject of first vertex */
                PrevOut = TRUE
                SaveSpace = subspace
    else if (PrevOut)
        if (ReallyClip)
                /* continue Sutherland-Hodgman algorithm */
                clip (1,P)
        else if (subspace = = SaveSpace)
                /* trivial reject */
                TS = P
        else
                /* begin Sutherland-Hodgman by moving */
                /*out of non-visible volume */
                ReallyClip = TRUE
                for (p is 1 through MAXPLANE)
                    First[p] = FALSE
                    F[p] = TF
                    S[p] = TS
                    if (P is on non-visible side of Plane[p])
                        exit from this loop
                clip(1,P)
    else if (subspace = = 0)
            /* trivial accept */
            output(P)
            TS = P
    else
            /* begin Sutherland-Hodgman by moving */
            /*out of visible volume */
            PrevOut = TRUE
            ReallyClip = TRUE
            for (p is 1 through MAXPLANE)
                First[p] = FALSE
                F[p] = TF
                S[p] = TS
            clip(1,P)
}
trivclose()
{
    if (PrevOut)
        PrevOut = FALSE
        if (ReallyClip)
            /* close polygon clipped */
            /*by Sutherland-Hodgman algorithm */
                ReallyClip = FALSE
                close(1)
        else
            /* no close required for trivially */
            /*rejected polygon */
    else
            /* close trivially accepted polygon */
            output (close)
    Tfirst = TRUE
}
```

That the implementation of the above-described algorithm will in fact operate to effect the trivial accept and the trivial reject situations should be obvious to those skilled in the art. To demonstrate this, however, the two situations are now considered.

Presuming a triangular 40 such as that shown in FIG. 4 having two vertices V41 and V42 lying in the visible subspace and a third vertex V43 lying in the subspace A to the left (shown by the dotted lines extending to the left of the left clipping plane) of the visible subspace is clipped in accordance with the algorithm described, various variables are first defined. These include the previously discussed first vertex which has its flag set true, and the vertices storing the first vertex and the saved vertex for each clipping plane. Also defined are three boolean values Tfirst, PrevOut, and ReallyClip which are set, respectively true, false, and false and an integer value SaveSpace.

At the first step, the algorithm reviews the incoming first vertex P and determines which subspace it falls in. The manner of determining this is well known to those skilled in the art. For example, any consistent numbering of the subspaces will suffice. A simple convention is to define subspace numbers as MAXPLANE-bit binary values, with one bit corresponding to each clipping plane. That bit is set if the point is on the non-visible side of the clipping plane so that the MAXPLANE-bit binary values, with one bit corresponding to each clipping plane. That bit is set if the point is on the non-visible side of the clipping plane so that the clip test fails but is otherwise cleared. This convention is used in the above pseudocode with the visible subspace designated 0.

As the vertex V41 is the first vertex, the Tfirst flag is true and is reset to false. TS and TF are each set to the value of P. Since V41 lies in subspace 0, the value of P (V41) is provided as output for display. The remainder of the algorithm is not utilized since the vertex V41 is in the visible subspace.

The algorithm then treats vertex V42 and determines that it falls in subspace 0. V42 is not the first vertex so Tfirst is false and the first portion of the algorithm is skipped. PrevOut is also false since the vertex V41 is in the visible subspace and thus, PrevOut has not been set to true. Consequently, the algorithm moves to the determination "else if (subspace=0)", finds this to be true regarding the vertex V42, outputs P (V42), and sets TS to the value of P (V42).

Thus, it will be seen that so long as the vertices remain in the visible subspace, the implementation of the algorithm of this invention simply provides the vertices as output values for the display without utilizing the Sutherland-Hodgman algorithm at all. Thus, this implementation drastically reduces the system operation time for those polygons which appear completely within the visible subspace. It will be noted that if all vertices remain in the visible subspace, the algorithm closes by setting the output to close and resetting the Tfirst flag to true.

When, however, the algorithm encounters the third vertex V43 and finds it lies in subspace A, V43 is not the first vertex so Tfirst is false and the first portion of the algorithm is skipped. PrevOut is also false since the vertices V41 and V42 both lie in the visible subspace so PrevOut has not been set to true. Consequently, the algorithm moves to the determination "else if (subspace=0)", finds this to be false, and skips to the last "else" where the PrevOut and ReallyClip flags are set to true and the initialization for the Sutherland-Hodgman algorithm previously described in detail above (algorithm clip p,P) takes place. After the Sutherland-Hodgman algorithm commences, it continues and finishes the clipping required for the given polygon in the process defining the intersection points $I_1$ and $I_2$.

The close portion of the final algorithm is believed to be entirely self explanatory and so is not discussed in detail. It merely resets the various flags and closes the operation as explained above.

FIG. 5 illustrates a triangle 50 with vertices V51 and V52 lying in subspace A and vertex V53 lying in the visible subspace. When the triangle 50 is treated by this algorithm after all of the initialization has been completed, the first vertex V51 is found to lie in subspace A. Then, the Tfirst flag is set to false, and TF and TS are set to P (vertex V51). The algorithm skips to the trivial reject of the first vertex, sets the PrevOut flag to true, and stores the subspace A value as SaveSpace.

Then, the remainder of the algorithm is skipped for the vertex V51, and the algorithm looks at vertex V52. This is not the first vertex so the algorithm skips to "else if (PrevOut)" and finds it set to true. However, However, ReallyClip is not true since no clipping has been done to this point so the algorithm skips to "else if (subspace=SaveSpace)". Since V52 is also in subspace A, the condition is true and TS is set to P (vertex 52). The remainder of the algorithm is skipped for this vertex, and the next vertex V53 is considered.

It should be obvious from the above description that the implementation of the algorithm simply considers the points of a polygon all of the vertices of which lie in the same subspace outside the visible space without the necessity of using the Sutherland-Hodgman algorithm at all. Consequently, the trivial reject situation also operates to conserve system operation time where all vertices lie outside the visible space in a single subspace.

When the algorithm encounters the third vertex V53, however, the subspace of that vertex V53 is computed and found to be the visible subspace O. Since the vertex V53 is not the first vertex, the operation skips to the determination of whether the PrevOut flag has been set and finds it to be true. However, the Sutherland-Hodgman process has not started and the subspace is not subspace A, so the operation skips to begin the Sutherland-Hodgman operation. The flag ReallyClip is set to indicate that the Sutherland-Hodgman operation has begun and the operation steps through the initialization process for the Sutherland-Hodgman algorithm discussed is detail above.

As before, when the polygon is finally completed, the operation is closed as explained above.

Although the invention has been described with reference to particular arrangements and systems, it will be apparent to those skilled in the art that the details of those arrangements and systems are used for illustrative purposes and should not be taken as limitations of the invention. For example, the implementation of the algorithm of the invention may be used for two or three dimensional images against any reasonable number of clipping planes. It is, thus, to be contemplated that many changes and modifications may be made by those of ordinary skill in the art without departing from the scope and spirit of the invention. The invention should therefore be considered to be described only in terms of the claims which follow.

What is claimed is:

1. A system for displaying graphic images comprising:
   preselected clipping planes;
   particular subspaces defined by said preselected clipping planes;
   polygons containing vertices;
   clipping means for clipping said polygons against said preselected clipping planes by operating on the vertices of each of said polygons rather than the edges of each of said polygons;
   determining means for determining when the vertices of one of said polygons all lie within one of a number of said particular subspaces defined by said preselected clipping planes; and
   disabling means for disabling the clipping means so long as all vertices of one of said polygons lie in a same subspace of said particular subspaces.

2. The system as claimed in claim 1 further comprising implementing means for implementing said clipping means if a vertex appears in a subspace different than the subspace of other polygon vertices.

3. The system as claimed in claim 2 wherein said implementing means comprises initializing means for preparing said system to the condition to which said system would have been set had said clipping means not been disabled by said disabling means.

4. The system as claimed in claim 3 wherein said initializing means places said system in a condition to which said system would have been set if all vertices previously clipped lay within the visible subspace.

5. The system as claimed in claim 3 wherein said initializing means places said system in a condition to which said system would have been set if all vertices previously clipped lay within a single non-visible subspace.

6. The system as claimed in claim 1 wherein said clipping means comprises a single clipping engine.

7. The system as in claim 3 wherein said particular subspaces comprises 9 subspaces in a 2-dimensional system for displaying graphic images.

8. The system as in claim 3 wherein said particular subspaces comprises 27 subspaces in a 3-dimensional system for displaying graphic images.

9. In a system for displaying graphic images having clipping means for clipping polygons against preselected clipping planes by sequentially testing polygon vertices, using clipping engines, wherein the improvement comprising:
   said clipping means normally operative, by operating on the vertices of said polygon rather than the edges of said polygon;
   a first subspace defined by said clipping planes;
   a second subspace defined by said clipping planes;
   determining means for determining when said tested polygon vertices all lie within said first subspace or when said tested polygon vertices all lie within said second subspace; and
   disabling means for interrupting said clipping means from operating while all tested polygon vertices lie in said first subspace or while all tested polygon vertices lie in said second subspace, said disabling means communicatively coupled to said determining means.

10. The improvement of claim 9 further comprising implementing means for entering and for starting said clipping means when a tested polygon vertex appears in a subspace different than the subspace of other of said tested polygon vertices, said implementing means communicatively coupled to said clipping means.

11. The improvement of claim 10 wherein said implementing means comprises initializing means for preparing said system to the condition to which said system would have been set had said clipping means been operative by not being interrupted by said disabling means.

12. The improvement of claim 11 wherein said initializing means places said system in a condition to which said system would have been set had all vertices previously clipped lay within the first subspace.

13. The improvement of claim 12 wherein said first subspace is the visible subspace of the graphics image display.

14. The improvement of claim 11 wherein said initializing means places said system in a condition to which said system would have been set had all vertices previously clipped lay within the second subspace.

15. The improvement of claim 14 wherein said second subspace is a non-visible subspace of the graphics image display.

16. The improvement of claim 9 wherein said clipping means comprises a single clipping engine.

17. A system for displaying graphic images wherein said graphic images may be composed of a plurality of polygons, said system comprising:
   clipping planes for clipping said polygons;
   clipping means for clipping said polygons against said clipping planes by sequentially testing polygon vertices, said clipping means normally operative, said clipping means for generating resultant displayable polygon vertices, by operating on the vertices of each of said polygons rather than the edges of each of said polygons;
   a first subspace defined by said clipping planes;
   a second subspace defined by said clipping planes;
   determining means for determination when said tested polygon vertices all lie within said first subspace or when said tested polygon vertices all lie within said second subspace, said determining means also for generating an output indicative of said determination, said determining means for generating resultant displayable polygon vertices; and
   disabling means for interrupting said clipping means from operating while all tested polygon vertices lie in said first subspace or while all tested polygon vertices lie in said second subspace, said disabling means communicatively coupled to said determining means, said disabling means for receiving said determination output.

18. The system of claim 17 further comprising implementing means for entering and for invoking said clipping means when a presently tested polygon vertex of said tested polygon vertices appears in a subspace different than the subspace of other of said tested polygon vertices, said implementing means communicatively coupled to said clipping means.

19. The system of claim 18 further comprising output means for reporting said resultant displayable polygon vertices, said output means communicatively coupled to said clipping means and communicatively coupled to said determining means.

20. The system of claim 18 wherein said implementing means comprises initializing means for preparing said system to the condition to which said system would have been set had said clipping means remained operative by not being interrupted by said disabling means.

21. The system of claim 20 wherein said initializing means places said system in a condition to which said system would have been set had all vertices previously clipped lay within the first subspace.

22. The system of claim 21 wherein said first subspace is the visible subspace of the graphics image display.

23. The system of claim 20 wherein said initializing means places said system in a condition to which said system would have been set had all vertices previously clipped lay within the second subspace.

24. The system of claim 23 wherein said second subspace is a non-visible subspace of the graphics image display.

25. The system of claim 17 wherein said clipping means comprises a single clipping engine.

26. The system of claim 17 wherein said clipping means operates under the Sutherland-Hodgman method.

* * * * *